United States Patent
Cheng et al.

(10) Patent No.: US 10,991,948 B1
(45) Date of Patent: Apr. 27, 2021

(54) SURFACE-TREATED COPPER FOIL FOR LITHIUM-ION SECONDARY BATTERIES

(71) Applicant: CHANG CHUN PETROCHEMICAL CO., LTD., Taipei (TW)

(72) Inventors: Kuei-Sen Cheng, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/825,658

(22) Filed: Mar. 20, 2020

(51) Int. Cl.
*H01M 4/66* (2006.01)
*H01M 4/04* (2006.01)
*H01M 10/0525* (2010.01)

(52) U.S. Cl.
CPC ......... *H01M 4/667* (2013.01); *H01M 4/0469* (2013.01); *H01M 4/661* (2013.01); *H01M 10/0525* (2013.01); *Y10T 428/12431* (2015.01); *Y10T 428/12438* (2015.01)

(58) Field of Classification Search
None
See application file for complete search history.

(56) References Cited

U.S. PATENT DOCUMENTS

| | | | |
|---|---|---|---|
| 2014/0030591 A1* | 1/2014 | Kohiki | H01M 4/661 429/211 |
| 2018/0062199 A1* | 3/2018 | Kim | H01M 4/0407 |
| 2020/0127328 A1* | 4/2020 | Lee | H01M 10/052 |

FOREIGN PATENT DOCUMENTS

| | | | |
|---|---|---|---|
| JP | 6193534 | * | 9/2017 |
| KR | 20190025273 | * | 3/2019 |

* cited by examiner

*Primary Examiner* — Xiaobei Wang
(74) *Attorney, Agent, or Firm* — Nixon Peabody LLP; Thomas P. Pavelko

(57) ABSTRACT

Surface-treated copper foils including a copper foil having a first side and an opposite-facing second side and two treatment layers disposed on the first side and the second side respectively are described. Each treatment layer provides a treated surface which exhibit a ten-point average roughness Rz in a range of 1.2 μm to 4.6 μm and a peak density (Spd) in a range of 490,000 to 1,080,000 $mm^{-2}$. Additionally, the Cr content in each of the treatment layers is a range of 25 to 70 $\mu g/dm^2$. The surface-treated copper foils have excellent electrode active material coating properties, such as good adhesion and uniformity.

15 Claims, No Drawings

SURFACE-TREATED COPPER FOIL FOR LITHIUM-ION SECONDARY BATTERIES

FIELD OF THE INVENTION

The present disclosure relates to surface-treated copper foil that can be used, for example, as current collectors for lithium-ion secondary batteries. This disclosure also relates to surface-treated copper foils having excellent adhesion to active material coatings.

BACKGROUND

Lithium-ion secondary batteries have a combination of high energy and high power density, making it the technology of choice for portable electronic devices, power tools, electric vehicles ("EVs"), energy storage systems ("ESS"), cell phones, tablets, space applications, military applications, and railways. Electric vehicles (EVs), include hybrid electric vehicles ("HEVs"), plug-in hybrid electric vehicles ("PHEVs"), and pure battery electric vehicles ("BEVs"). If electric vehicles (EVs) replace the majority of fossil fuel (e.g., gasoline, diesel fuel, etc.) powered transportation, lithium-ion secondary batteries will significantly reduce greenhouse gas emissions. The high energy efficiency of lithium-ion secondary batteries may also allow their use in various electric grid applications, including improving the quality of energy harvested from wind, solar, geo-thermal and other renewable sources, thus contributing to their more widespread use in building an energy-sustainable economy.

Therefore, lithium-ion secondary batteries are of intense interest for commercial ventures as well as in basic research in government and academic laboratories. Although research and development in this field has abounded in recent years and lithium-ion secondary batteries are currently in use, there remains a need for improvements with respect to higher capacity, higher current generation, and batteries that can undergo more charge/discharge cycles thereby extending their useful life. Additionally, improvements in the weight of the batteries are needed to improve applications in several environments, such as vehicle, portable electronics and space applications.

Secondary lithium-ion batteries typically include a current collector of a metal foil on which is deposited an active material, Copper foils are often used as the current collector because copper is a good conductor of electrical current. As demands for lower weight batteries become ever more urgent, the current collector needs to be thinner to reduce the size and weight of lithium-ion secondary battery. Additionally, to increase the capacity of the lithium-ion secondary battery, materials such as silicon (Si), are mixed with or fill the higher capacity active material in a battery. In contrast to carbon, silicon-based active materials have much higher capacity for lithium-ion battery and as a result are capable of almost ten times the energy capacity per gram (mAh/g). Silicon base anode lithium-ion batteries have greater energy storage capacity and/or smaller battery size, or greater battery cycle life. However, silicon based anodes have limitations to applications because the size of silicon changes up to 400% when inserting and extracting lithium-ion. This phenomenon results in pulverization and capacity fading. In addition, Silicon based anode materials are easily detached from the current collector, and results in lithium battery failure.

Additional challenges relate to processing. For example, processing includes depositing the active material on the copper foil as a slurry, drying this combination in an oven at high temperatures and then a calendering step. Breaking of the copper foil often occurs after the calendering step. Also, since these steps occur in an ambient air environment, the copper foil is exposed to oxygen and can become oxidized, exacerbating its propensity to being damaged. Although the copper foil typically includes an anti-tarnish coating such as a chromium coating, in some instances this does not provide enough protection to the copper foil if the copper foil is not sufficiently coated and also can increase the resistivity in the electrode can occur if too much chromium is used.

There therefore remains a need for improved copper foils for use in lithium-ion secondary batteries. Copper foils having improved surface properties such as adhesion to active materials are a current need. Furthermore, good uniformity of the active material on the electrode, and good mechanical strength so they can withstand damage during processing can further fulfill other needs.

SUMMARY

In general, the disclosure described herein relates to copper foils such as electrodeposited copper foils that can be used as current collectors in lithium-ion secondary batteries. Surface-treated copper foils have been prepared that can have high adhesion to the copper foils.

In a first aspect, this disclosure provides a surface-treated copper foil comprising a copper foil and two treatment layers. The copper foil has a first side and an opposite-facing second side. One of the treatment layers is disposed on the first side, and the other one of the treatment layers is disposed on the second side. Each treatment layer provides a treated surface. The treated surface exhibits a ten-point average roughness Rz in a range of 1.2 μm to 4.6 μm and a peak density (Spd) in a range of 490,000 to 1,080,000 $mm^{-2}$, and the Cr content in each of the treatment layers is in a range of 25 to 70 $μg/dm^2$.

In some options of the first aspect, the treated surface exhibits an Rz in the range of 1.5 μm to 3.4 μm. Optionally, the treated surface exhibits an Spd equal to or less than 950,000 $mm^{-2}$. Optionally the treated surface exhibits an Rz in the range of 1.5 μm to 3.4 μm and the treated surface exhibits an Spd equal to or less than 950,000 $mm^{-2}$. Optionally, the treated surface exhibits an Spd equal to or less than 900,000 $mm^2$.

In some other options according to the first aspect, the Cr content in each of the treatment layers is less than or equal to 60 $μg/dm^2$. Optionally, each treatment layer includes a nodule layer and an anti-tarnish layer. Optionally, the copper foil is an electrodeposited copper foil.

Also in accordance with the first aspect, the surface-treated copper foil optionally further exhibits a tensile strength (TS) in a range of 36 $Kg/mm^2$ to 60 $Kg/mm^2$, and a tensile strength reduction (TSR) lower than 45%, wherein the TSR is defined as Formula I:

$$TSR = \frac{(TS - TSa)}{TS} \times 100\%;$$

wherein TSa is a remaining tensile strength after annealing the copper foil at 140° C. for 10 min. Optionally, the surface-treated copper foil exhibits a TSR lower than 10%.

In a second aspect, this disclosure provides a secondary lithium-ion battery comprising the surface-treated copper foil according to the first aspect and an active material coated on at least a portion of the treated surface. Optionally, the copper foil is an electrodeposited copper foil having a drum side corresponding to the first side, and a deposited side corresponding to the second side. Optionally, the active material is coated only on the treated surface proximate to the deposited side of the copper foil. In some options the battery is configured as a laminate type battery, and in some other options the battery is configured as a coin type battery.

The surface-treated copper foil as described herein show excellent surface properties such as adhesion to active materials. Furthermore, in some embodiments the uniformity of coatings and mechanical strength are further improved, so they can withstand damage during processing such as calendering.

The above summary is not intended to represent every embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

DETAILED DESCRIPTION

Surface-treated copper foils having two opposite sides are described. A bulk copper foil, substantially consisting of copper (e.g., >99 wt. % copper), is coated on both sides to provide the surface-treated copper foils, with a coating on both of the opposing sides. The coating includes a treatment layer comprising a Cr content in a range of 25 to 70 µg/dm². Each of the treatment layers provides a treated surface having a roughness, Rz, that is controlled in a range of 1.2 µm to 4.6 µm and a peak density (Spd) in a range of 490,000 to 1,080,000 mm².

In some embodiments the surface-treated copper foil is prepared from an electrodeposited copper foil made using a drum deposition providing a bulk copper foil having a drum side and a deposited side. As used herein the "drum side" of the copper foil is the surface of the copper foil that is in contact with a drum used during the electrodeposition, while the "deposited side" is the opposite side, or the surface of the electrodeposited copper foil that is in contact with an electrolyte solution during the electrodeposition forming the copper foil. These terms relate to a manufacturing process for producing electrodeposited copper foils which include partially immersing a rotating drum assembly into an electrolyte solution containing copper ions. Therefore, under operation of an electric current, copper ions are drawn to the drum and reduced, resulting in copper metal plating onto the surface of the drum forming an electrodeposited copper foil on the surface of the drum. This copper foil so formed is removed from the drum in a continuous process by rotating the drum and removing the copper foil as the formed copper foil rotates with the drum out of the electrolyte solution. For example, the copper foil can be pulled off the drum as it is formed by, and passed over or through rollers in a continuous process. In some embodiments the drum side corresponds to a first side and the deposited side corresponds to a second side.

One feature of the surface-treated copper foil according to some embodiments is the surface roughness. "Roughness" as used herein refers to the deviations in a surface in a direction normal to the real surface from an ideal, perfectly smooth, surface. Various methods of quantifying roughness are known in the art. For example, ten-point average roughness Rz is a surface roughness based on profiling a surface over a sampling length (L). The sum of the highest five peaks and lowest five peaks are calculated as an average. This is represented by Formula II:

$$Rz = \frac{|Rp1 + Rp2 + Rp3 + Rp4 + Rp5| + |Rv1 + Rv2 + Rv3 + Rv4 + Rv5|}{5}.$$

In Formula II: Rp1, Rp2, Rp3, Rp4 and Rp5 are the levels of the highest peak to the fifth highest peak in L; and Rv1, Rv2, Rv3, Rv4 and Rv5 are the levels of the lowest trough to the fifth lowest trough in L.

In some embodiments the Rz has been found to modulate the adhesion of the copper foil to an active material. Without being bound by any specific theory it is proposed could be considered that having a very low Rz does not provide enough anchorage for the active material to the copper foil, while having too high Rz does not allow for a uniform coating. The adhesion can be tested by a peel strength test, for example as described below. In some embodiments, the Rz on the treated surface of the surface-treated copper foil is greater than or equal to 1.2 µm and less than or equal to 4.6 µm, such as about 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5 or 4.6 µm, and any between these listed values.

Another feature of the surface-treated copper foil according to some embodiments is the peak density (Spd). As used herein the "peak density", "Spd" and "density of peaks" are equivalent terms and refers to the number of peaks in a given surface area. The peak density (Spd) is defined based on ISO 25178-2:2012.

In some embodiments the Spd can have a strong effect on the adhesion to the surface. Without being bound to any specific theory it could be considered that if Spd is too small, there is not enough contact between an active material and the surface of the surface-treated copper foil the so the peel strength is low. Conversely, if Spd is too large, an active material slurry such as an anode slurry, cannot sufficiently penetrate into the valleys between the peaks on the surface. Poor contact due to the poor penetration of the slurry leads to poor peel strength once the slurry has been dried onto the surface. In some embodiments the treated surface exhibits an Spd in a range of a low value such as 490,000, and a high value such as 1,080,000 mm$^{-2}$. In some embodiments the Spd is less than or equal to a high value such as 1,000,000; 950,000; 900,000; 800,000; 700,000; 600,000; or 500,000 mm$^{-2}$. In some embodiments the Spd is greater than or equal to a low value such as 500,000; 600,000; 700,000; 800,000; 900,000 or 1,000,000 mm$^{-2}$. It is understood that some embodiments can include any value between these high and low values.

In some embodiments, the surface-treated copper foil includes a nodule layer as part of the treatment layer. In some embodiments the nodule layer can include metal nodules such as copper nodules. The nodules can be formed, for example, by electroplating the metal onto an electrodeposited copper foil. In some embodiments, the copper nodules can be made of copper or copper alloy. In some embodiments the treatment layer includes a metal cover layer on the metal nodules, such as a copper deposition on copper nodules. For example, the metal cover layer can help to prevent exfoliation of the metal nodules.

In some embodiments, the surface-treated copper foil includes an anti-tarnish layer as part of the treatment layer which can protect the surface-treated copper foil from degradation such as due to corrosion. This can be made by any known method and includes dipping or passing the formed electrodeposited copper foil or nodule covered copper foil through a solution containing anti-tarnish forming additives, or plating (e.g., electroplating) a metal or alloy film on the formed electrodeposited copper foil or nodule covered copper-foil. For example, a bath including any one or more of zinc, chromium, nickel, cobalt, molybdenum, vanadium and combinations thereof; or an organic compound that forms an anti-tarnish layer. The processing can be continuous and part of the overall process in preparing the surface-treated copper foil.

In some embodiments the surface-treated copper foil includes two treatment layers, such as on a first side and opposite-facing second side, and the chromium concentration is controlled in a range between a low and a high value in the treatment layer. Without ascribing to a specific mechanism, it could be considered that if the chromium concentration is too low, the surface area coverage by the chromium after a nodule treatment is low and the peel strength decreases. Conversely, if the chromium concentration is too high, the chromium coverage may be too high or thick and lead to a high resistance, such as when the copper foil is used for a lithium-ion battery electrode. In some embodiments the chromium concentration is equal to or more than a low value of 25, 30, 35, 40, 45, 50, 55, 60 or 65 $\mu g/dm^2$. In some embodiments the chromium concentration is less than or equal to a high value of 70, 65, 60, 55, 50, 45, 40, 35 or 30 $\mu g/dm^2$. It is understood that different embodiments can include any chromium concentration values between these listed high and low values.

In some embodiments a characteristic of the surface-treated copper foil is the tensile strength (TS). As used herein, "tensile strength" relates to the maximum amount of tensile stress a material can be subjected to before it mechanically breaks or fractures, such as breaking into two parts. Having control of the tensile strength (TS) provides a surface-treated copper foil that can withstand tearing due to processing, such as pulling between rollers and calendering. The tensile strength (TS) can be related to the grain size of copper in the copper-foil because increase in grain boundaries increase the force required to deform the copper foil. When the tensile strength (TS) is too low the surface-treated copper foil can more easily bend and tear, when the tensile strength (TS) is too high the surface-treated copper foil is difficult to bend, which can be detrimental in further processing.

In some embodiments the tensile strength (TS) is controlled in a range between a low and a high value. In some embodiments the low value of tensile strength (TS) is equal to or more than 36, 40, 45, 50 or 55 $Kg/mm^2$. In some embodiment the high value of tensile strength (TS) is equal to or less than 60, 55, 50, 45 or 40 $Kg/mm^2$. It is understood that different embodiments include any tensile strength (TS) values for the surface-treated copper foil between these listed high and low values.

In some embodiments a characteristic of the surface-treated copper foil is the remaining tensile strength (TSa) after heating to a high temperature and cooling to ambient temperature. This heat treatment can simulate the thermal history a copper foil undergoes during the active material slurry drying process. After oven baking, the tensile strength of surface-treated copper foil will decrease and can result in breaking during further processing such as calendering. A "tensile strength reduction" or "TSR" as used here is the percent of remaining tensile strength (TSa) as compared to the original tensile strength (TS), after subjecting a sample to a 10 min 140° C. annealing step. This is defined by Formula I as previously described. Without being bound to any specific theory a high TSR is indicative of a surface-treated copper foil that easily recrystallizes and is thermal unstable. In some embodiments the TSR as recited herein is controlled to have a value equal to or less than 45%. In some embodiments the TSR is equal to or less than 40%, 30% or 10%.

In some embodiments, the surface-treated copper foil is at least partially coated with an active material. For example, the active material can be an active anode material such as comprising carbon, silicon, germanium and combinations or mixtures of these. In some embodiments the active anode material comprises silicon. In some embodiments only one of the sides of the surface-treated side is coated with an active material. In some embodiments the surface-treated copper foil comprises an electrodeposited copper foil having a drum side corresponding to the first side, and a deposited side corresponding to the second side, and an active material is at least partially coated on the treated surface proximate to the deposited side of the copper foil which is the first side.

In some embodiments, the electrodeposited copper foils can be used as current collectors for batteries such as secondary lithium-ion secondary batteries. In some embodiments the battery is configured as a laminate battery, such as including a laminated structure of a copper anode current collector, an anode active material, a separator, an active cathode material, and a cathode current collector. In some other embodiments the battery is configured as a coin type battery.

The surface-treated copper foils according to these herein described embodiments can be used in a device such as any item or component requiring electric power for its operation. For example, self-contained, isolated and mobile components and devices requiring small and light batteries. Without limitation, these can include vehicles (automobiles, street cars, buses, trucks, boats, submarines, airplanes), computers (e.g., for microcontrollers, laptops, tablets), phones (e.g., smart phones, wireless landlines), personal health monitoring and sustaining equipment (e.g., glucose monitors, pacemakers), tools (e.g., electric drills, electric saws), illuminators (e.g., flashlights, emergency lighting, signs), hand held measuring devices (e.g., pH meters, air monitoring devices) and habitation units (e.g., in a spaceship, in a trailer, in a house, in a plane, in a submarine).

It should be understood within the scope of the present disclosure, the above-mentioned technical features and technical features mentioned below (such as examples) can be combined freely and mutually to form new or preferred technical solutions, which are omitted for brevity.

Examples

I. Surface-Treated Copper Foil Preparation

An electrolyte was made by dissolving copper wire in an aqueous solution of sulfuric acid (50 wt %) affording a copper sulfate electrolyte solution which contained 260 to 320 g/L of copper sulfate ($CuSO_4.5H_2O$) and 60 to 100 $\mu g/L$ of sulfuric acid. To every liter of the copper sulfate electrolyte: 0 to 3.5 mg of gelatin (DV: Nippi Company); 0 to 3 mg of hydroxyethyl cellulose (LC-400; DAICEL Company); 0 to 2.4 mg of sodium 3-mercapto-1-propanesulfonate (MPS: HOPAX Company); 0 to 7 mg of thiourea (manufactured by Panreac Quimica Sau); and 2 to 20 mg chloride ion was added. Sixteen solutions were made and the specific concentrations are listed for each of experiments 1-12 and comparative experiments 13-16 in Table 1.

Bulk copper foils (raw copper foils) were prepared by electrodeposition on a rotating drum, where the drum is partially immersed in the electrolyte solution described above and listed in Table 1. The drum acts as a cathode to a counter anode electrode which causes copper ions in the electrolyte to deposit on the drum in a continuous fashion. Copper foils having a thickness of about at least 7 μm, such as 8 to 20 μm, were prepared using a current density of 25 to 70 $A/dm^2$ and controlling the electrolyte solution temperature at about 40 to 70° C. The conditions are listed in Table 1.

TABLE 1

Conditions for Preparing Electrodeposited Copper Foil

| Exp. | Copper sulfate (g/l) | Sulfuric acid (g/l) | gelatin (mg/l) | hydroxyethyl cellulose (mg/l) | thiourea (mg/l) | MPS (mg/l) | Chloride (mg/l) | Temp. (° C.) | Current density (A/dm$^2$) |
|---|---|---|---|---|---|---|---|---|---|
| 1 | 320 | 100 | 3.5 | 1.5 | 1.5 | 1.2 | 20 | 45 | 50 |
| 2 | 320 | 100 | 3.5 | 1.5 | 0.8 | 1.2 | 20 | 45 | 50 |
| 3 | 320 | 80 | 3.5 | 1.5 | 0.8 | 1.2 | 20 | 45 | 30 |
| 4 | 320 | 100 | 3.5 | 1.5 | 3.5 | 2.4 | 15 | 45 | 50 |
| 5 | 320 | 100 | 3.5 | 1.5 | 3.5 | 2.4 | 15 | 45 | 50 |
| 6 | 320 | 100 | 3.5 | 1.5 | 3.5 | 2.4 | 15 | 45 | 50 |
| 7 | 320 | 100 | 3.5 | 3 | 2 | 1.2 | 20 | 45 | 50 |
| 8 | 320 | 100 | 3.5 | 1.5 | 3.5 | 2.4 | 15 | 45 | 50 |
| 9 | 320 | 100 | 3.5 | 1.5 | 3.5 | 2.4 | 15 | 40 | 60 |
| 10 | 320 | 100 | 3.5 | 1.5 | 3.5 | 2.4 | 15 | 45 | 50 |
| 11 | 260 | 100 | 0 | 0 | 0 | 0 | 2 | 45 | 50 |
| 12 | 320 | 100 | 3.5 | 1 | 7 | 2.4 | 15 | 45 | 50 |
| C.13 | 320 | 60 | 3.5 | 1.5 | 0.8 | 1.2 | 20 | 45 | 25 |
| C.14 | 320 | 100 | 3.5 | 1.5 | 3.5 | 2.4 | 15 | 50 | 70 |
| C.15 | 320 | 100 | 3.5 | 1.5 | 3.5 | 2.4 | 15 | 45 | 50 |
| C.16 | 320 | 100 | 3.5 | 3 | 2 | 1.2 | 20 | 45 | 50 |

After the electrodeposited copper foil was produced, both sides of the bulk copper foil were treated by a nodule treatment. The treatment was done by electrodeposition at a temperature of 25 to 30° C. using a current density of 30 to 60 A/dm$^2$ and a residence time in the electrolyte solution of 3.5 to 7 seconds. The electrolyte solution included 120 to 180 μg/l Copper sulfate (CuSO$_4$.5H$_2$O); 80 to 120 μg/l Sulfuric acid (H$_2$SO$_4$); 3.5 to 5.5 μg/l Chloride ion; and 0 to 480 μg/l Chromium sulfate (Cr$_2$(SO$_4$)$_3$). The conditions for the nodule treatment are listed in Table 2 for the sixteen experiments.

TABLE 2

Conditions for Nodule Treatment of Bare Copper Foil.

| Exp. | Copper sulfate (g/l) | Sulfuric acid (g/l) | Chloride ion (g/l) | Chromium sulfate (g/l) | Temp. (° C.) | Current density (A/dm$^2$) | Time (Sec) |
|---|---|---|---|---|---|---|---|
| 1 | 120 | 100 | 3.5 | 350 | 25 | 40 | 3.5 |
| 2 | 160 | 100 | 5.5 | 350 | 30 | 45 | 5.5 |
| 3 | 160 | 120 | 5.5 | 350 | 30 | 45 | 5.5 |
| 4 | 120 | 100 | 3.5 | 0 | 25 | 50 | 5 |
| 5 | 120 | 100 | 3.5 | 405 | 25 | 50 | 5 |
| 6 | 120 | 100 | 3.5 | 480 | 25 | 60 | 7 |
| 7 | 120 | 100 | 3.5 | 250 | 25 | 55 | 3.5 |
| 8 | 120 | 100 | 3.5 | 100 | 25 | 45 | 4 |
| 9 | 120 | 80 | 3.5 | 100 | 25 | 45 | 4 |
| 10 | 120 | 100 | 3.5 | 200 | 25 | 40 | 3.5 |
| 11 | 120 | 100 | 3.5 | 250 | 25 | 50 | 5 |
| 12 | 120 | 100 | 3.5 | 250 | 25 | 50 | 5 |
| C.13 | 160 | 120 | 5.5 | 350 | 30 | 45 | 5.5 |
| C.14 | 120 | 100 | 3.5 | 100 | 25 | 45 | 4 |
| C.15 | 180 | 100 | 5.5 | 0 | 30 | 45 | 3.5 |
| C.16 | 120 | 100 | 3.5 | 350 | 30 | 30 | 3.5 |

Following the nodule treatment, the copper foil was rinsed with water and both sides of the nodule-treated copper foil were treated with chromium plating. The chromium plating bath contained 1.5 μg/l CrO$_3$. The electroplating was conducted at 5 A/dm$^2$ for 5 seconds while the chromium plating bath was maintained at 30° C.

Table 3 lists several surface-treated copper foils made as described above. These were characterized to determine their normal thickness. Both sides were also characterized with respect to the surface roughness (Rz), the chromium content, and the peak density (Spd). The Tensile strength (TS) and Tensile Strength Reduction (TSR) were also determined. The elongation was also determined. Properties to evaluate their performance, such as for use in a lithium-ion battery were then determined. Adhesion was evaluated using a Peel strength test, where an anode material was applied to a side of the surface-treated copper foil as described in the test methods below. The uniformity of an active material coating was also evaluated using a test as described in the test methods below.

TABLE 3

Surface-Treated Copper foils

| Ex | Thick in μm | Drum side Rz in μm | Dep. side Rz in μm | Drum side Cr in μg/dm$^2$ | Dep. side Cr in μg/dm$^2$ | Spd drum side in m$^{-2}$ | Spd dep. side in m$^{-2}$ | Peel strength drum side in kg/cm | Peel strength dep. side in kg/cm | TS in kg/mm$^2$ | TSa in kg/mm$^2$ | TSR in % | Elong. in % | Calend. test[1] | Unif.[2] |
|---|---|---|---|---|---|---|---|---|---|---|---|---|---|---|---|
| 1 | 10 | 1.64 | 1.53 | 52.8 | 52.1 | 534,983 | 513,965 | 0.36 | 0.35 | 45.5 | 42.0 | 7.7 | 12.5 | O | O |
| 2 | 10 | 1.65 | 1.58 | 51.1 | 50.2 | 691,285 | 675,951 | 0.34 | 0.32 | 36.4 | 33.6 | 7.7 | 10.8 | O | O |
| 3 | 10 | 1.66 | 1.57 | 51 | 50.3 | 510,367 | 498,526 | 0.35 | 0.33 | 36.5 | 33.8 | 7.4 | 10.7 | O | O |
| 4 | 10 | 3.02 | 2.94 | 32.9 | 30.2 | 613,568 | 590,113 | 0.36 | 0.35 | 56.5 | 54.0 | 4.6 | 10.2 | O | O |
| 5 | 10 | 3.12 | 2.96 | 57.8 | 56.5 | 614,099 | 591,875 | 0.41 | 0.40 | 56.3 | 53.6 | 4.8 | 10.1 | O | O |

TABLE 3-continued

Surface-Treated Copper foils

| Ex | Thick in μm | Drum side Rz in μm | Dep. side Rz in μm | Drum side Cr in μg/dm² | Dep. side Cr in μg/dm² | Spd drum side in m⁻² | Spd dep. side in m⁻² | Peel strength drum side in kg/cm | Peel strength dep. side in kg/cm | TS in kg/mm² | TSa in kg/mm² | TSR in % | Elong. % | Calend. test[1] | Unif.[2] |
|---|---|---|---|---|---|---|---|---|---|---|---|---|---|---|---|
| 6 | 10 | 4.51 | 4.32 | 69.7 | 68.2 | 863,254 | 840,758 | 0.45 | 0.43 | 52.1 | 50.4 | 3.3 | 9.2 | O | Δ |
| 7 | 10 | 3.68 | 3.46 | 46.8 | 44.2 | 530,178 | 511,637 | 0.38 | 0.36 | 48.2 | 43.5 | 9.8 | 9.8 | O | Δ |
| 8 | 8 | 2.12 | 2.03 | 36.7 | 35.6 | 591,367 | 570,442 | 0.32 | 0.31 | 52.3 | 47.8 | 8.6 | 7.8 | O | O |
| 9 | 8 | 2.13 | 2.04 | 36.8 | 35.9 | 1,079,838 | 1,056,682 | 0.34 | 0.33 | 52.5 | 48.1 | 8.4 | 7.7 | O | Δ |
| 10 | 20 | 1.56 | 1.52 | 42.5 | 41.2 | 532,281 | 517,896 | 0.4 | 0.39 | 59.8 | 55.5 | 7.2 | 17.2 | O | O |
| 11 | 10 | 3.06 | 2.98 | 49.3 | 48.2 | 615,123 | 597,865 | 0.34 | 0.33 | 58.2 | 29.5 | 49.3 | 8.5 | X | O |
| 12 | 10 | 2.98 | 2.87 | 45.3 | 44.2 | 614,099 | 593,112 | 0.42 | 0.41 | 65.2 | 63.6 | 2.5 | 4.8 | X | O |
| C.13 | 10 | 1.64 | 1.57 | 51.2 | 50 | 467,992 | 449,685 | 0.26 | 0.25 | 36.4 | 33.7 | 7.4 | 10.9 | O | O |
| C.14 | 8 | 2.13 | 2.05 | 36.5 | 35.8 | 1,105,739 | 1,086,725 | 0.22 | 0.21 | 52.4 | 47.9 | 8.6 | 7.8 | O | X |
| C.15 | 10 | 1.68 | 1.54 | 20.5 | 19.2 | 533,127 | 515,968 | 0.25 | 0.24 | 56.5 | 53.9 | 4.6 | 12.3 | O | O |
| C.16 | 10 | 1.12 | 1.08 | 52.2 | 51.6 | 534,011 | 515,789 | 0.27 | 0.25 | 45.2 | 41.6 | 8.0 | 12.8 | O | O |

[1]Calendering test: "O" indicates no breaking; "X" indicates the surface-treated copper foil breaks.
[2]Uniformity evaluates the flatness of the anode active material coated on the surface-treated copper foil: "O" indicates good; "Δ" indicates acceptable; "X" indicates poor.

These results show surface-treated copper foils in experiments 1-15 having controlled roughness (Rz) in a range of 1.2 μm to 4.6 μm. Experiments 1-12, C.15-C.16 are surface-treated copper foils having a peak density (Spd) in a range of 490,000 to 1,080,000 mm². Chromium content concentrations in a range of 25 to 70 μg/dm² are exhibited in experiments 1-12, C.14 and C.16. Therefore experiments 1-12 all meet the roughness, peak density and chromium concentrations in these ranges. All of these surface-treated copper foils have good adhesion properties according to the peel strength test which shows values greater than about 0.3 kg/cm. All of these experiments also have at least acceptable active material uniformity. In addition, further controlling Rz in the range of 1.5 μm to 3.4 μm and Spd in a range of 490,000 to 950,000 mm-2 can further improve the uniformity, such as experiments 1-5, 8, and 10.

It is also seen from this data that, in addition to maintaining the above ranges for roughness, peak density and chromium concentration, if the tensile strength (TS) is too high, greater than about 60 Kg/mm² (experiment 12) or the TSR is too high, greater than about 45% (experiment 11); the calendering test performance is poor.

II. Test Methods

Calendering (Pressing) Test

A silicon alloy-based active substance (average particle size of from 0.1 to 10 μm) was used in powder form. An active material was prepared using 90 wt. % silicon alloy-based active substance and 10 wt. % polyimide-based binder. The active material was dispersed in N-methylpyrrolidone (NMP) solvent to form a slurry. The slurry was made to have a liquid to solid ratio of 60 wt % (60 g of NMP:100 g of the active material). The slurry was coated on a portion of the surface of a surface-treated copper foil at a speed of 5 meters per minute to a thickness of 200 μm. The slurry was then dried onto the copper foil in an oven set at 140° C. for 10 minutes. A boundary can be defined between where the copper foil is coated with the active material and where the copper foil is not coated. The anode (copper foil+active material) was pressed using a pressing machine. The dimension of the rollers of the pressing machine were φ250 mm×250 mm, hardness of the rollers was 6265° HRC, and the roller material was high-carbon chrome bearing steel (SUJ2). A 1 m/min pressing (calendering) speed and 3000 psi pressure were used. The surface-treated copper foil was fed so that the boundary between coated/non-coated copper foil was approximately perpendicular to the feed direction and approximately parallel to the pressing roller axis. Therefore, the calendering test evaluated if the surface-treated copper foil could withstand this calendering treatment. If the surface-treated copper foil did not break at the boundary as the rollers rolled over the boundary, this was noted as a pass or "O." Conversely breaking was noted as a fail or "X."

Peal Strength Test

An anode having an active material and calendered as described above was prepared. After calendering, the anode was cut to obtain a test sample sized to 200 mm×20 mm (length×width). SCOTCH® MAGIC™ (3M Company) tape was attached to the surface of the test sample, and then the peel strength was measured using Model DS2-20N force measurement machine of IMADA.

Tensile Strength and Elongation Percent

The tensile strength (TS) and elongation percent was determined using standard test method IPC-TM-650. Accordingly, a surface-treated copper foil without annealing or calendering was cut to obtain a test sample dimensioned to 100 mm×12.7 mm (length×width). The tensile strength (TS) and elongation percent of this sample was measured at room temperature (about 25° C.) using a Model AG-I testing machine (Shimadzu Corporation) with a chuck distance of 50 mm and a crosshead speed of 50 mm/min.

The test method for the remaining tensile strength (TSa) was the same as the above method, except the test sample. The test sample was prepared by cutting a surface-treated copper foil to 100 mm×12.7 mm (length×width), and then putting it in an oven with 140° C. for 10 min. The test sample was cooled down at room temperature (about 25° C.) for at least 5 min after being removed from the oven.

The tensile strength reduction TSR is defined as Formula I:

$$TSR = \frac{(TS - TSa)}{TS} \times 100\%$$

Chromium Content

The chromium content was determined by first cutting the surface-treated copper foil to a size of 150×150 mm. A protective coating was applied to one side of the surface-treated copper foil to prevent that side from dissolving. After drying the protective coating, the specimen was further cut into a size of 100×100 mm (area=1 dm$^2$). The specimens were then placed into a dish and dissolved with 20 ml of 18% HCl solution for ten minutes at about room temperature (~25° C.). The solution was then poured from the dish into a 50 ml volumetric flask. The dish was rinsed with water, and the rinsing's added to the volumetric flask to provide the total volume of 50 ml. The amount of chromium in the solution was measured using to ICP-AES.

Roughness (Rz)

A surface roughness measuring instrument (Kosaka Laboratory Ltd; SE 1700 Series) was used to detect the profile of the surface-treated copper foils. Rz was obtained using standard test method JIS B 0601-1994.

Density of Peaks (Spd)

The Density of Peaks (Spd) of surface-treated copper foils were measured in accordance with ISO 25178-2:2012 by using surface texture analysis of laser microscope (manufactured by Olympus, LEXT OLS5000-SAF). The following conditions were used.

Light source: 405 nm-wavelength.
Objective lenses: 50× (MPLAPON-100xLEXT).
Optical zoom: 1.0×.
Area: 129 μm×129 μm.
Resolution: 595 pixels×595 pixels.
Conditions: Auto tilt removal.
Filter: S filter=1 μm, L filter=100 μm.
Air temperature: 24±3° C.
Relative humidity of 63±3%.
Uniformity The uniformity is an evaluation of the flatness of active material coated on the surface-treated copper foil. An anode having active material and the surface-treated copper foil was prepared, as previously described in the Calendering (Pressing) Test. After the calendering process, an anode strip of 25×5 cm size was cut from coated area of the anode. Further, five samples pieces were cut out of the anode strip, each dimensioned to be 5×5 cm. The weight deviation was then determined by Formula III:

$$\text{Percent Weight deviation} = \frac{(\text{Max. weight} - \text{min. weight})}{\text{Average weight}} \times 100\%.$$

The uniformity was assigned as listed in Table 4.

TABLE 4

Uniformity Rating

| Weight deviation | uniformity |
|---|---|
| <3% | O (good) |
| 3%~5% | Δ (acceptable) |
| >5% | X (bad) |

As used herein the term "comprising" or "comprises" is used in reference to compositions, methods, and respective component(s) thereof, that are essential to the claimed invention, yet open to the inclusion of unspecified elements, whether essential or not.

As used herein the term "consisting essentially of" refers to those elements required for a given embodiment. The term permits the presence of elements that do not materially affect the basic and novel or functional characteristic(s) of that embodiment of the claimed invention.

The term "consisting of" refers to compositions, methods, and respective components thereof as described herein, which are exclusive of any element not recited in that description of the embodiment.

As used in this specification and the appended claims, the singular forms "a," "an," and "the" include plural references unless the context clearly dictates otherwise. Thus for example, references to "the method" includes one or more methods, and/or steps of the type described herein and/or which will become apparent to those persons skilled in the art upon reading this disclosure and so forth. Similarly, the word "or" is intended to include "and" unless the context clearly indicates otherwise.

Other than in the operating examples, or where otherwise indicated, all numbers expressing quantities of ingredients or reaction conditions used herein should be understood as modified in all instances by the term "about." The term "about" when may mean 5% (e.g., 4%, ±3%, ±2%, ±1%) of the value being referred to.

Where a range of values is provided, each numerical value between and including the upper and lower limits of the range is contemplated as disclosed herein. It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Unless otherwise defined herein, scientific and technical terms used in connection with the present application shall have the meanings that are commonly understood by those of ordinary skill in the art. Further, unless otherwise required by context, singular terms shall include pluralities and plural terms shall include the singular.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

Any patents, patent applications, and publications including ASTM, JIS methods identified that are disclosed herein are expressly incorporated herein by reference for the purpose of describing and disclosing, for example, the methodologies described in such publications that can be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

We claim:

1. A surface-treated copper foil comprising;
   a copper foil having a first side and an opposite-facing second side,
   two treatment layers, one of the treatment layers is disposed on the first side, and the other one of the treatment layers is disposed on the opposite-facing second side, and each treatment layer, respectively, providing a treated surface on the copper foil, wherein each of the treated surfaces on the copper foil exhibits a ten-point average roughness Rz in a range of 1.52 µm to 4.51 µm and a peak density (Spd) in a range of 498,526 to 1,079,838 mm$^{-2}$, and wherein the Cr content in each of the two treatment layers is in a range of 30.2 to 69.7 µg/dm$^2$.

2. The surface-treated copper foil according to claim 1, wherein each of the treated surfaces exhibits a ten-point average roughness Rz in the range of 1.52 µm to 3.4 µm.

3. The surface-treated copper foil according to claim 2, wherein each of the treated surfaces exhibits an Spd in the range of 498,526 to 950,000 mm$^2$.

4. The surface-treated copper foil according to claim 1, wherein each of the treated surfaces exhibits an Spd in the range of 498,526 to 950,000 mm$^2$.

5. The surface-treated copper foil according to claim 1, wherein each of the treated surface exhibits an Spd in the range of 498,526 to 900,000 mm$^2$.

6. The surface-treated copper foil according to claim 1, wherein the Cr content in each of the treatment layers is in the range of 30.2 to 60 µg/dm$^2$.

7. The surface-treated copper foil according to claim 1, wherein the surface treated copper foil exhibits a tensile strength (TS), before annealing, in a range of 36 Kg/mm$^2$ to 60 Kg/mm$^2$, and a tensile strength reduction (TSR) lower than 45%, wherein the TSR is defined as:

$$TSR = \frac{(TS - TSa)}{TS} \times 100\%;$$

wherein TSa is a remaining tensile strength after annealing the surface-treated copper foil at 140° C. for 10 min.

8. The surface-treated copper foil according to claim 7, wherein the surface-treated copper foil exhibits a TSR lower than 10%.

9. The surface-treated copper foil according to claim 1, wherein each treatment layer includes a nodule layer and an anti-tarnish layer.

10. The surface-treated copper foil according to claim 1, wherein the copper foil is an electrodeposited copper foil.

11. A secondary lithium-ion battery comprising the surface-treated copper foil of claim 1 and an active material coated on at least a portion of at least one of the treated surfaces.

12. The secondary lithium-ion battery according to claim 11, wherein the copper foil is an electrodeposited copper foil having a drum side corresponding to the first side, and a deposited side corresponding to the second side.

13. The secondary lithium-ion battery of claim 12, wherein the active material is coated only on the treated surface proximate to the deposited side of the copper foil.

14. The secondary lithium-ion battery of claim 11, wherein the battery is configured as a laminate type battery.

15. The secondary lithium-ion battery of claim 11, wherein the battery is configured as a coin type battery.

* * * * *